(12) United States Patent
Brandis

(10) Patent No.: US 12,530,342 B2
(45) Date of Patent: Jan. 20, 2026

(54) ANALYZING A PROCESSING ENGINE OF A TRANSACTION- PROCESSING SYSTEM

(71) Applicant: MARC BRANDIS AG, Zug (CH)

(72) Inventor: Marc Brandis, Zug (CH)

(73) Assignee: MARC BRANDIS AG (CH)

( * ) Notice: Subject to any disclaimer, the term of this patent is extended or adjusted under 35 U.S.C. 154(b) by 0 days.

(21) Appl. No.: 17/274,808

(22) PCT Filed: Sep. 20, 2019

(86) PCT No.: PCT/EP2019/075420
§ 371 (c)(1),
(2) Date: Mar. 10, 2021

(87) PCT Pub. No.: WO2020/064575
PCT Pub. Date: Apr. 2, 2020

(65) Prior Publication Data
US 2021/0271666 A1  Sep. 2, 2021

(30) Foreign Application Priority Data

Sep. 28, 2018 (EP) ..................................... 18197679

(51) Int. Cl.
*G06F 16/23* (2019.01)
(52) U.S. Cl.
CPC ............................... *G06F 16/2379* (2019.01)
(58) Field of Classification Search
CPC .................................................. G06F 16/2379
(Continued)

(56) References Cited

U.S. PATENT DOCUMENTS

| 8,521,871 B2 | 8/2013 | Bodziony et al. ............ 709/224 |
| 9,450,849 B1 | 9/2016 | Goldberg et al. |

(Continued)

FOREIGN PATENT DOCUMENTS

EP  2 515 265 A1  10/2012

OTHER PUBLICATIONS

International Search Report mailed Oct. 23, 2019 in corresponding PCT International Application No. PCT/EP2019/075420.
(Continued)

*Primary Examiner* — Mark E Hershley
*Assistant Examiner* — Antonio J Caiado
(74) *Attorney, Agent, or Firm* — OSTROLENK FABER LLP

(57) ABSTRACT

An electronic device and a method of operating an electronic device for analyzing a processing engine of a transaction-processing system. Determined are data records related to transactions of the transaction-processing system, the data records including one or more data fields. Determined are in an embodiment, on the basis of data fields representing interface identifiers of interfaces used for sending requests and receiving replies, associations between request and reply data records. Determined are, on the basis of the similarity or identity of the contents of one or more data fields, indicative associations between data records. Assigned are, on the basis of the contents of one or more data fields of the respective data records, association weight sums to the indicative associations. Determined are, on the basis of the respective association weight sums, data records being associated to each other. Data records being associated to each other belong to the same transaction.

17 Claims, 8 Drawing Sheets

(58) Field of Classification Search
USPC .......................................................... 707/703
See application file for complete search history.

(56) References Cited

U.S. PATENT DOCUMENTS

| | | | | |
|---|---|---|---|---|
| 2003/0126091 | A1* | 7/2003 | Rogers | H04W 12/03 |
| | | | | 705/64 |
| 2006/0159028 | A1 | 7/2006 | Curran-Gray et al. | 370/252 |
| 2008/0098208 | A1* | 4/2008 | Reid | G06F 11/3636 |
| | | | | 712/234 |
| 2009/0125563 | A1* | 5/2009 | Wong | G06F 16/256 |
| 2011/0112869 | A1* | 5/2011 | Greak | G06Q 40/08 |
| | | | | 705/26.1 |
| 2011/0225075 | A1* | 9/2011 | Maw | G06Q 40/00 |
| | | | | 705/34 |
| 2011/0238538 | A1 | 9/2011 | Allison, Jr. et al. | 705/30 |
| 2013/0179988 | A1* | 7/2013 | Bekker | H04L 63/0823 |
| | | | | 726/27 |
| 2014/0039299 | A1* | 2/2014 | Foo | A61B 5/055 |
| | | | | 600/417 |
| 2014/0180802 | A1* | 6/2014 | Boal | G06Q 20/209 |
| | | | | 705/14.49 |
| 2014/0279945 | A1* | 9/2014 | Agarwal | G06F 16/214 |
| | | | | 707/690 |
| 2016/0189488 | A1* | 6/2016 | Arnone | G07F 17/3244 |
| | | | | 463/25 |
| 2017/0091320 | A1* | 3/2017 | Psota | G06F 16/3337 |
| 2018/0095933 | A1* | 4/2018 | Maruhashi | G06F 15/82 |
| 2018/0129698 | A1* | 5/2018 | Johnson | H04L 9/0643 |

OTHER PUBLICATIONS

Written Opinion mailed Oct. 23, 2019 in corresponding PCT International Application No. PCT/EP2019/075420.

Wikipedia contributors, "Data-flow diagram," *Wikipedia, The Free Encyclopedia*, https://en.wikipedia.org/wiki/Data_flow_diagram, accessed Mar. 8, 2021.

Wikipedia contributors, "Systems management," *Wikipedia, The Free Encyclopedia*, https://en.wikipedia.org/wiki/Systems_management, accessed Mar. 8, 2021.

Wikipedia contributors, "List of systems management systems," *Wikipedia, The Free Encyclopedia*, https://en.wikipedia.org/wiki/List_of_systems_management_systems, accessed Mar. 8, 2021.

Wikipedia contributors, "Fingerprint (computing)," *Wikipedia, The Free Encyclopedia*, https://en.wikipedia.org/wiki/Fingerprint_(computing), accessed Mar. 8, 2021.

Wikipedia contributors, "Hash function," *Wikipedia, The Free Encyclopedia*, https://en.wikipedia.org/wiki/Hash_function, accessed Mar. 8, 2021.

Wikipedia contributors, "Activation function," *Wikipedia, The Free Encyclopedia*, https://en.wikipedia.org/wiki/Activation_function, accessed Mar. 8, 2021.

Wikipedia contributors, "Gradient descent," *Wikipedia, The Free Encyclopedia*, https://en.wikipedia.org/wiki/Gradient_descent, accessed Mar. 8, 2021.

Wikipedia contributors, "Breadth-first search," *Wikipedia, The Free Encyclopedia*, https://en.wikipedia.org/wiki/Breadth-first_search, accessed Mar. 8, 2021.

Wikipedia contributors, "Linear programming," *Wikipedia, The Free Encyclopedia*, https://en.wikipedia.org/wiki/Linear_programming, accessed Mar. 8, 2021.

Wikipedia contributors, "Simplex algorithm," *Wikipedia, The Free Encyclopedia*, https://en.wikipedia.org/wiki/Simplex_algorithm, accessed Mar. 8, 2021.

Wikipedia contributors, "Dataflow programming," *Wikipedia, The Free Encyclopedia*, https://en.wikipedia.org/wiki/Dataflow_programming,, accessed Mar. 8, 2021.

* cited by examiner

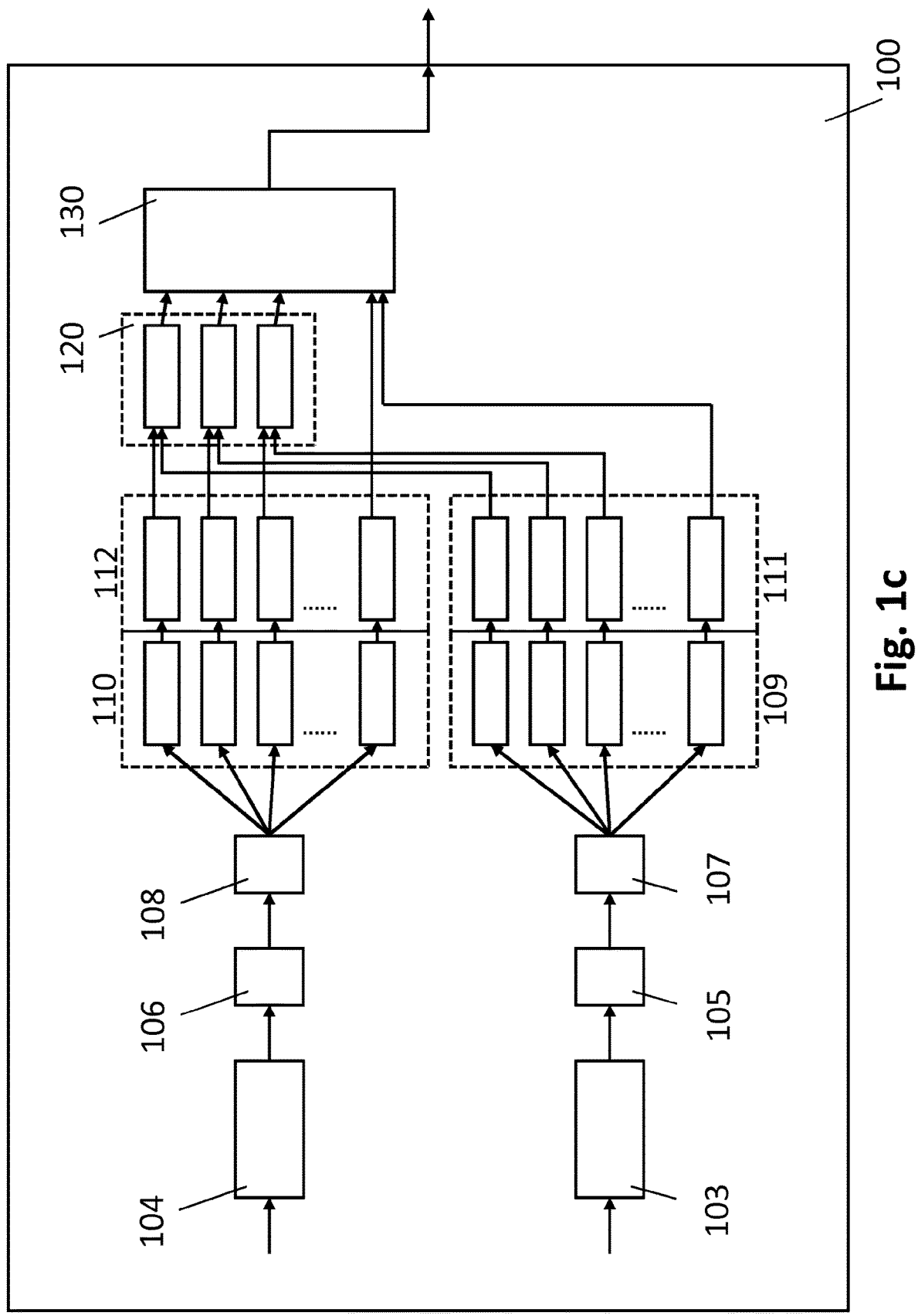

| Result 0 | Result 1 | Result 2 | Result 3 | Op | Attr | ID | t | Ra | Ta | Interface | Param 0 | Param 1 | Param 2 | Param 3 | Param 4 | Param 5 |
|---|---|---|---|---|---|---|---|---|---|---|---|---|---|---|---|---|
| 125.00 | 123-99-1 | CHF | ... | RECEIVE | {ORDER} | A | 10000 | / | | OrderIn | | | | | | |
| 3'720.55 | 987-00-8 | CHF | | RECEIVE | {ORDER} | B | 10001 | / | | OrderIn | | | | | | |
| | | | | SEND | {REQUEST} | C | 10005 | D | ? | CustomerDataOut | 987-00-8 | | CHF | ... | | |
| PR-K | ... | | | RECEIVE | {REPLY} | D | 10010 | C | ? | CustomerDataIn | | | | | | |
| | 00023 | | | SEND | {REQUEST} | E | 10011 | ? | ? | AccountDataOut | 3'720.55 | 987-00-8 | | | | |
| | | | | SEND | {REQUEST} | F | 10011 | ? | ? | CustomerDataOut | 123-99-1 | ... | CHF | | PR-K | 00023 |

Fig. 1g

| | | | | | mg | 2 |
|---|---|---|---|---|---|---|
| | | | | | sg | 4 |
| Field Values | Definitions (RecordID.ResultNo) | Uses (RecordID.ParamNo) | #Definitions | #Uses | #occurrences | w = g(...) |
| 125.00 | A.0 | - | 1 | 0 | 1 | 0.915776192 |
| 3'720.55 | B.0 | E.0 | 1 | 1 | 2 | 0.800000000 |
| 00023 | D.2 | E.5 | 1 | 1 | 2 | 0.800000000 |
| 123-99-1 | A.1 | F.0 | 1 | 1 | 2 | 0.800000000 |
| 987-00-8 | B.1 | C.0, D.1 | 1 | 2 | 3 | 0.595390325 |
| CHF | A.2, B.2 | C.2, F.2 | 2 | 2 | 4 | 0.351214356 |
| PR-K | D.0 | E.3 | 1 | 1 | 2 | 0.800000000 |

Fig. 1h

| Record | Indicative Association | Delta t | w = f(...) | w = g(...) | w = f()*g() | | Association Weight Sums | | Chosen Association |
|---|---|---|---|---|---|---|---|---|---|
| | | mf | 15 | | | | | | |
| | | sf | 0.5 | | | | | | |
| A | | | | | | | C->A | 0.351182468 | |
| B | | | | | | | C->B | 0.946573062 | C->B |
| C | Param 0: B.1 | 4 | 0.999966598 | 0.595390325 | 0.595370437 | | D->C | 1 | D->B // associated as REQUEST/REPLY pair C/D |
| C | Param 2: A.2 | 5 | 0.999909208 | 0.351214356 | 0.351182468 | | E->D | 1.599605186 | |
| C | Param 2: B.2 | 4 | 0.999966598 | 0.351214356 | 0.351202624 | | E->B | 2.890979404 | E->B // associated to B both directly and through D/C |
| D | | | | | | | F->A | 1.110534074 | F->A |
| E | Param 0: B.0 | 10 | 0.986703291 | 0.800000000 | 0.789362633 | | F->B | 0.346544361 | |
| E | Param 1: B.1 | 10 | 0.986703291 | 0.595390325 | 0.587473593 | | | | |
| E | Param 3: D.0 | 6 | 0.999753241 | 0.800000000 | 0.799802593 | | | | |
| E | Param 5: D.2 | 6 | 0.999753241 | 0.800000000 | 0.799802593 | | | | |
| F | Param 0: A.1 | 11 | 0.964663156 | 0.800000000 | 0.771730525 | | | | |
| F | Param 2: A.2 | 11 | 0.964663156 | 0.351214356 | 0.338803549 | | | | |
| F | Param 2: B.2 | 10 | 0.986703291 | 0.351214356 | 0.346544361 | | | | |

Fig. 1i

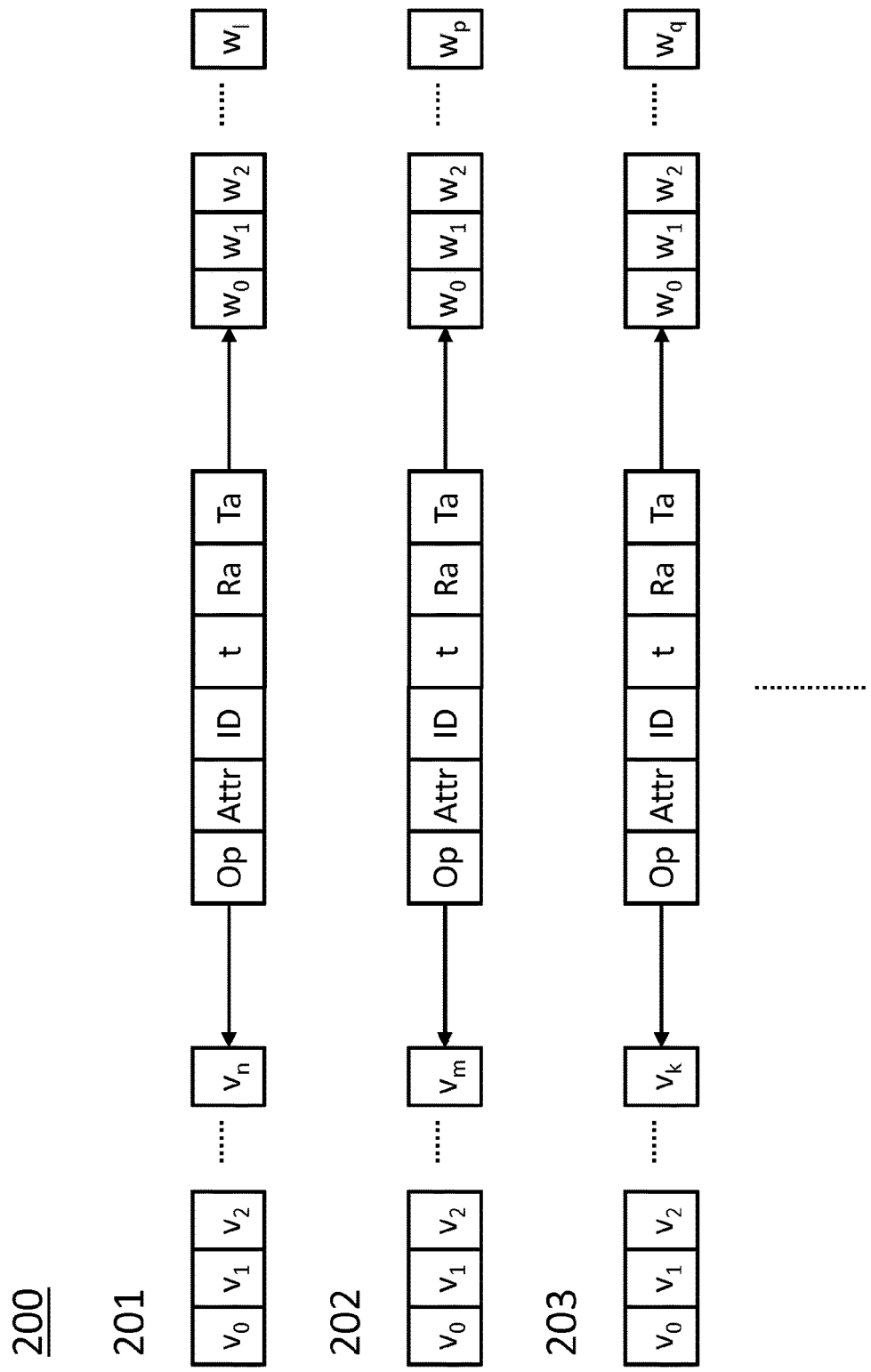

ANALYZING A PROCESSING ENGINE OF A TRANSACTION- PROCESSING SYSTEM

CROSS-REFERENCE TO RELATED APPLICATIONS

The present application is a 35 U.S.C. §§ 371 national phase conversion of International Application No. PCT/EP2019/075420, filed Sep. 20, 2019, which claims priority to European Patent Application No. 18197679.6, filed Sep. 28, 2018, the contents of both of which are incorporated herein by reference. The PCT International Application was published in the English language.

FIELD OF THE INVENTION

The present invention relates to an electronic device and a method of operating an electronic device for analyzing a processing engine of a transaction-processing system.

BACKGROUND ART

The present disclosure concerns transaction-processing systems having attributes as follows. Transaction-processing systems receive a transaction order in the form of a receive order data record having a number of data fields having specific contents indicating which type of transaction on which data shall be performed. In accordance to the transaction order, transaction-processing systems perform a sequence of operations, typically including transmitting requests in the form of send request data records to other systems for receiving replies in the form of receive reply data records from these systems or from persistent data stores (subsequently referred to as Golden Sources). During transaction processing, wherein a processing engine of the transaction processing system processes the transactions, new data records and data fields are generated through copying, conversion, or mapping of data records and data fields received as part of the transaction order, in replies from other systems, or from Golden Sources. A transaction may trigger operations in other systems. Different operations may be executed depending on the specific transaction requested and on the specific values in the data records and data fields. At the end of a transaction, transaction-processing systems generate a transaction result in the form of zero or more send result data records having a number of data fields indicative about the result of the transaction.

Transaction-processing systems may also receive further data feeds or push data streams not directly related to a particular transaction, but used for transaction processing or for maintaining persistent data held in Golden Sources. In the specific field of transaction processing systems for processing financial data, such data may include foreign exchange rates used in currency conversions, price and volume information from trade exchanges, or daily account balances of accounts held with other companies participating in transaction processing, such as correspondent banks and clearing and settlement agents for banking or suppliers in wholesale and retail distribution, among other types of data.

Examples of transaction-processing systems include payment processing systems, security processing systems, or credit processing systems in banks or other financial services companies, as well as underwriting or claims handling systems in insurance companies, or order management and invoicing systems in wholesale or retail distribution companies, or order management systems in logistics companies, or production line management systems in manufacturing companies. These transaction-processing systems include a processing engine for processing the transactions, e.g. one or more computers for executing software instructions stored on a computer readable memory for processing transactions in accordance with the stored software instructions. Many more transaction-processing systems are deployed in the mentioned industries as well as in other industries. The present invention addresses all these transaction-processing systems, as well as any other systems with similar characteristics to those described above. Thus, so-called Message Hubs or in general any systems that provide transformation and mapping of data when transferring the data between systems are transaction-processing systems in the meaning of the present definition.

Generally, transaction-processing systems are able to process multiple transactions in parallel or in an overlapped fashion, so that at any point in time, there can be multiple transactions being at different stages in their processing. One consequence of this is that in input- and output-traces collected from a running transaction processing system, input and output data records related to the processing of different transactions are interleaved, with no obvious way of how to relate an individual data record or data field to a respective transaction.

Automated testing of transaction-processing systems may be required. Tools supporting the automated testing of transaction-processing systems may enable testing without real-life systems being in place in the test environment. For this purpose, input- and output-traces from a running transaction-processing system connected to real-life systems are collected, and the traces are played back to the transaction-processing sys-tem during testing, thereby simulating the behavior of the real-life systems unavailable in the test environment. However, differences in the order in which transactions are being processed or in the actual data used make such testing error-prone and some-times ineffective. Therefore, there is a need to analyze transaction-processing systems, in particular to relate individual data records to a respective transaction in order to avoid or reduce such errors.

Relating individual data records in the input and output traces of transaction-processing systems to their respective transaction is also a prerequisite for tool-based analysis of the process flow of individual transactions as part of system analysis, for statistical analysis of process flows, for machine learning based on process flows, for mimicking particular transactions of a transaction-processing system, etc.

U.S. Pat. No. 9,450,849B1 relates to trace backtracking. In response to receiving a request from an upstream component at a downstream component, a trace is initiated at the down-stream component. A response to the request is sent to the upstream component. The response comprises trace metadata. Trace data is generated at the upstream component. The trace data describes an interaction between the upstream component and the downstream component. A call graph is generated based on the trace data.

DISCLOSURE OF THE INVENTION

It is an object of the present invention to provide an electronic device and a method of operating an electronic device for analyzing a transaction-processing system, in particular a processing engine of the transaction-processing system, which do not have at least some of the disadvantages of the prior art. In particular, it is an object of the present invention to provide an electronic device and a method for analyzing a transaction-processing system, in particular a processing engine of the transaction-processing system, by providing associations between data records in input- and output data traces of the transaction-processing system.

According to the present invention, these objects are achieved through the features of the independent claims. In addition, further advantageous embodiments follow from the dependent claims and the description.

According to the present invention, the above-mentioned objects are particularly achieved in that an electronic device for analyzing a processing engine of a transaction-processing system is configured to: determine data records related to transactions of the transaction-processing system, the data records comprising one or more data fields; determine, on the basis of the similarity or identity of the contents of one or more data fields, indicative associations between data records; assign, on the basis of the one or more data fields of the respective data records, association weight sums to the indicative associations; determine, on the basis of the respective association weight sums, data records being associated to each other. In a variant, the data records being associated to each other are determined on the basis of a comparison of the respective association weight sums. Data records associated with each other belong to the same transaction. In other words, data records associated to each other are connected to each other via the same transaction. For example, based on a similarity or identity of the contents of data fields of a first data record with the contents of data fields of other data records, a plurality of indicative associations between the first data record and a plurality of other data records is determined. Based on the data fields of the first data record and the plurality of other data records, association weight sums are assigned to the indicative associations. For example, a timestamp may be included in the data fields and a higher association weight sum may be assigned for data records having a small time difference to the first data record. The association weight sum may be based on other data fields of the data records. Based on a comparison of the association weight sums, a second data record is determined from the plurality of other data records being associated with the first data record. For example, it may be concluded that the first data record and the second data record result from the same transaction. Configuration of the electronic device may be based on instructions stored in a computer memory and the instructions being executable by one or more computer processors. Configuration of the electronic device may be based on hardware-implemented logic circuits. The data records related to transactions of the transaction-processing system may be received via an interface of the electronic device, such as a network interface, a serial interface, a data store interface, etc. The electronic device provides for an association between data records, thereby enabling identification of data records related to each other or resulting from the same transaction. Comparison of association weight sums may be related to comparing if the value of one association weight sum is higher than the other, or to comparing if the value of one association weight sum is lower than the other, such that an association weight sum has a higher importance in case of a higher value, or a higher importance in case of a lower value, respectively.

In an embodiment, the processing engine of the transaction-processing system includes one or more computers for executing software instructions stored on a computer readable memory for processing transactions in accordance with the stored software instructions.

In an embodiment, the electronic device is further configured to subdivide the data records into a set of receive order data records, a set of send request data records, a set of receive reply data records, and optionally a set of send result data records, and to direct the indicative associations from the send request data records and/or optionally send result data records to the receive order data records or to the receive reply data records. The electronic device provides for an association between receive order data records, which initiate a particular transaction, and send request data records, which initiate requests related to a particular transaction, and for an association between receive reply data records, which includes a reply related to a particular transaction, and send request data records. It optionally provides for an association between send result data records and receive order data records. Accordingly, the electronic device provides for an association of data records related to a particular transaction.

In an embodiment, the electronic device is further configured to determine pairs of transaction related data records having indicative associations on the basis of the identity of a data field indicating an interface identifier. The interface identifier may relate to a running process of an external system. The interface identifier may relate to a network interface. Determining associations between data records may be simplified and made more robust. On each interface or interface pair used for send request data records and receive reply data records, a unique request identifier may be used by the transaction processing system to associate request and reply.

In an embodiment, the electronic device is further configured to determine send request data records and receive reply data records being associated to each other on the basis of a data field indicating an interface identifier and a data field indicating a unique request identifier, or on the basis of a data field indicating an interface identifier and contents of one or more data fields from the send request data record being replicated in the receive reply data record, or on the basis of a combination thereof.

In an embodiment, the electronic device is further configured to determine indicative associations between data records on the basis of send request data records or send results data records containing one or more data fields with the same content as receive order data records or receive reply data records.

In an embodiment, the electronic device is further configured to assign association weight sums to the indicative associations on the basis of the number of occurrences of one or more data fields. The association weight sum may reflect a higher importance for data fields which have a low number of occurrences.

In an embodiment, the electronic device is further configured to assign association weight sums to the indicative associations on the basis of a data field enabling determining a time difference between respective data records. The association weight sum may reflect a higher importance for data records which have a low time difference.

In an embodiment, the electronic device is further configured to assign association weight sums to the indicative associations by applying one or more non-linear functions. The non-linear functions may be applied to the number of occurrences of one or more data fields, to the time difference between respective data records, etc. By applying non-linear functions, the association weight sums include a non-linear weighting, such that for example a low number of occurrences of one or more data fields is weighted to have a higher importance, and that for example a small time difference between respective data records is weighted to have a higher importance, etc. The non-linearity of these functions provides for better association results as a time difference between send request data record and receive reply data record of 10 milliseconds and one of 100 milliseconds might well represent typical response times of connected systems and thus not call for a significantly different association weight sum between these cases, even though the time differences are a factor of 10 apart, while a time difference of 1,000 milliseconds might be very unlikely and thus call for a much lower association weight sum, with the time difference also being a factor of 10 apart. The exact shape of the non-linear functions used can be adapted to the statistical attributes of the transaction-processing system being analyzed, with respective parameters being set either by a human operator, or being determined automatically.

In an embodiment, the electronic device is further configured to assign a set of data records to a particular transaction. The set of data records may include a receive order data record, zero or more send request data records, and a corresponding number of receive reply data records. The set of data records may further include zero or more send result data records. The set of data records may be assigned to a particular transaction in accordance to the associations between data records.

In an embodiment, the electronic device is further configured to analyze data records in the form of one or more of: a comma separated list, an extended markup language, and a fixed binary record format. The electronic device is thereby adapted to analyze transaction-processing systems on the basis of a data format which is widely available.

In an embodiment, the electronic device is further configured to receive configuration data enabling subdividing the data records into a set of receive order data records, a set of send request data records, a set of receive reply data records, and optionally a set of send result data records. Configuration data may conform to a definition of data records of a transaction-processing system. Configuration data may be provided by a human operator. The electronic device is thereby adapted to analyze various types of transaction-processing systems.

Beside to an electronic device, the present invention also relates to a method for operating an electronic device for analyzing a processing engine of a transaction-processing system, the electronic device being configured to execute the method, the method comprising: determining data records related to transactions of a transaction-processing system, the data records comprising one or more data fields; determining, on the basis of the similarity or identity of one or more data fields, pairs of data records having indicative associations; assigning, on the basis of the one or more data fields of the respective data records, association weight sums to the indicative associations; determining, on the basis of a comparison of the respective association weight sums, data records being associated to each other.

In an embodiment, the method further comprises: subdividing the data records into a set of receive order data records, a set of send request data records, a set of receive reply data records, and optionally a set of send results data records, and directing the indicative associations from the send request data records or optionally the send results data records to the receive order data records or to the receive reply data records.

In an embodiment, the method further comprises: determining send request data records and receive reply data records being associated to each other on the basis of a data field indicating an interface identifier and a data field indicating a unique request identifier, or on the basis of a data field indicating an interface identifier and contents of one or more data fields from the send request data record being replicated in the receive reply data record, or on the basis of a combination thereof.

In an embodiment, the method further comprises: assigning association weight sums to the indicative associations on the basis of the number of occurrences of the contents of one or more data fields, and/or on the basis of a data field enabling determining a time difference between respective data records.

In an embodiment, the method further comprises: assigning association weight sums to the indicative associations by applying one or more non-linear functions.

In an embodiment, the method further comprises: assigning a set of data records to a particular transaction.

The electronic device and the method described above implement an analyzer. The electronic device receives data records related to the transactions of a transaction-processing system on the basis of the input- and output-traces of the transaction-processing system in raw format, i.e. raw data streams. In order to determine the data records, a pre-filter filters out data not related to the transaction processing, amends the traces with additional data, and provides as output a functional data flow representation of the traces (cf. https://en.wikipedia.org/wiki/Data_flow_diagram). The functional data flow representation provides for separation and identification of individual data records in the input- and output-traces, and for separation of individual data fields in these records. The analyzer enables identification of data records and association between data records. The analyzer enables for associating data records to respective transactions.

In more general terms, the analyzer enables for rescinding or rearranging the interleaving of the inputs and outputs in the original traces, making the data records related to the processing of a specific transaction readily accessible for further analysis, for use in automated testing, etc.

The present disclosure assumes that there is one input- and one output-trace for the transaction-processing system. The mechanisms described also apply if there are multiple input- or output-traces, which can be combined into a single input-trace and a single output-trace, potentially amended with identifiers from which original trace individual messages or data records were taken in the combination. The mechanisms also apply if input and output messages or data records are combined in a single trace with messages or data records being marked as input or output, respectively.

BRIEF DESCRIPTION OF THE DRAWINGS

The herein described invention will be more fully understood from the detailed description given herein below and the accompanying drawings which should not be considered limiting to the invention described in the appended claims. The drawings are showing:

FIG. 2 illustrates schematically a functional data flow representation of a plurality of data records.

MODE(S) FOR CARRYING OUT THE INVENTION

Figure 1A:
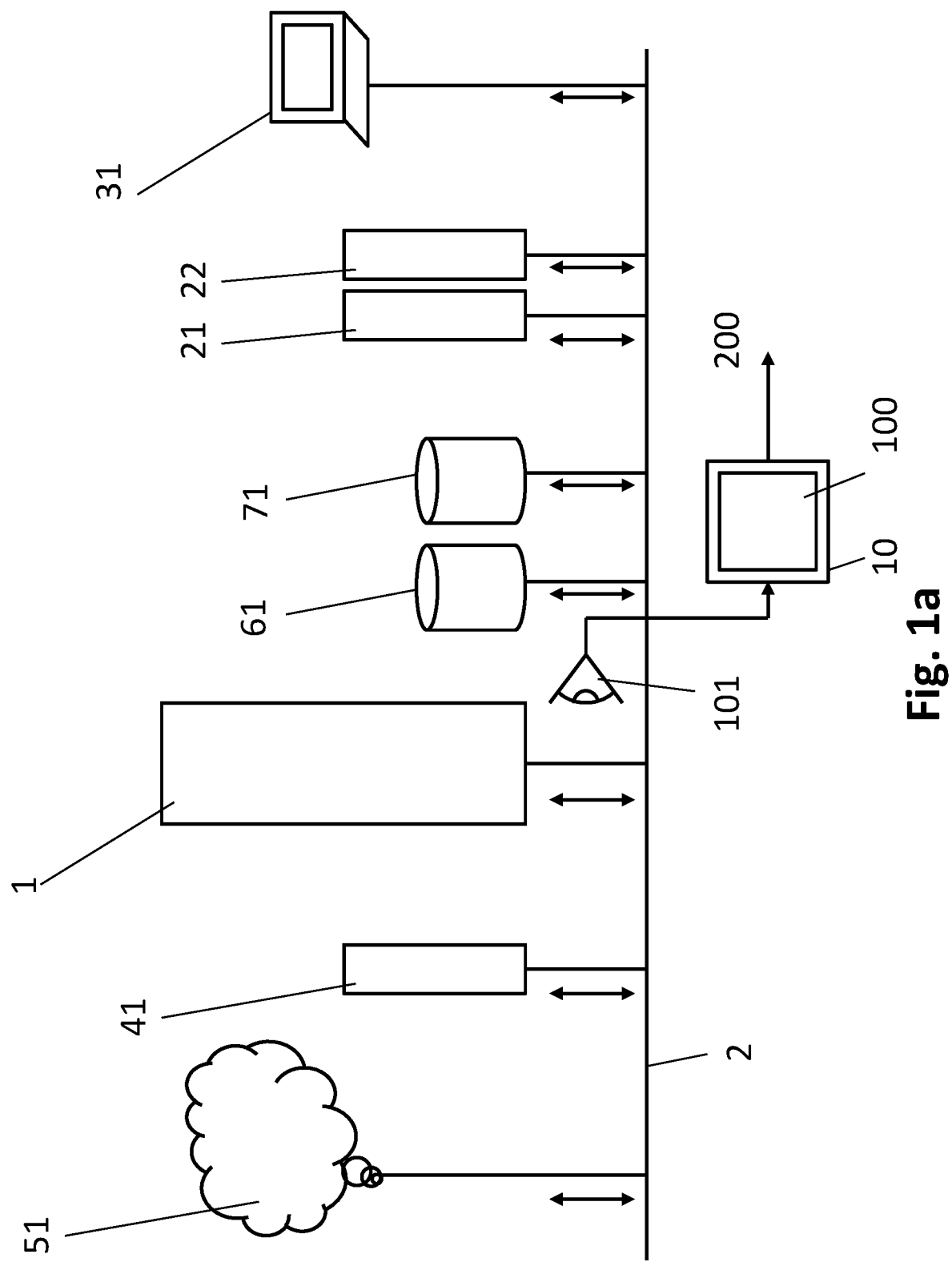
FIG. 1a illustrates schematically a transaction-processing system connected to other systems, wherein an electronic device implements an analyzer.

FIG. 1a illustrates schematically a transaction-processing system 1 connected to other systems 21, 22, 41, 51 via a network 2, to a terminal 31 operable by a human operator, or to Golden Sources data stores 61, 71. The transaction-processing system 1 includes a processing engine for processing transactions. In an embodiment, the processing engine includes one or more computers for executing software instructions stored on a computer readable memory for processing transactions in accordance with the stored software instructions. In an embodiment, the transaction-processing system 1 and/or the other systems include mainframe computers 21, 22, 41, 51. Other embodiments of the transaction-processing system 1 and/or the other systems 21, 22, 41, 51 are possible. In an embodiment, the Golden Sources data stores 61, 71 include database servers. Other embodiments of the Golden Sources data stores 61, 71 are possible. In an embodiment, the terminal 31 includes a personal computer. Other embodiments of the terminal 31 are possible. In an embodiment, the network 2 includes a IP based (Internet Protocol) network. Other embodiments of the network 2 are possible. In an embodiment, the Golden Sources data stores 61, 71 have stored aggregated data such as account data for an account held at a foreign bank (a so-called correspondent bank) participating in the processing of a transaction. In an embodiment, the Golden Sources data stores 61, 71 form part of the transaction-processing system 1.

The transaction-processing system 1 may be operated by a particular organization, such as a bank. One or more of the other systems 21, 22 may belong to the same organization. One or more of the other systems 41 may belong to one or more other organizations. One or more systems 51 may relate to cloud services, Internet services, etc.

As illustrated in FIG. 1a, an electronic device 10, which implements an analyzer 100, is connected to a data collector 101 for collecting all data flowing into and out from the transaction-processing system 1. The data collector 101 may include a network interface enabling copying all traffic flowing into and out from the transaction-processing system 1. The data collector 101 may collect data via other means, such as via shared memory, through a directly attached electric connection (e.g. if the transaction-processing system 1 is implemented as an ASIC communicating through external pins with external systems), via a procedure call, or via any other manner, such as via the underlying processing circuitry of the transaction processing system 1 (e.g. a processor executing instructions comprising the transaction-processing system), via the underlying infrastructure (e.g. a virtual machine doing the same), via a computer operation system offering system tracing facilities (such as ptrace under Linux, SYSTRACE under z/OS, etc.) etc. Depending on the transaction-processing system 1, additional processing steps may be required not further addressed in this disclosure (e.g. a conversion between data collected in EBCDIC format on a mainframe computer and ASCII or Unicode format used on most other computers), or might not require some of the processing steps described below for the analyzer 100.

Figure 1B:
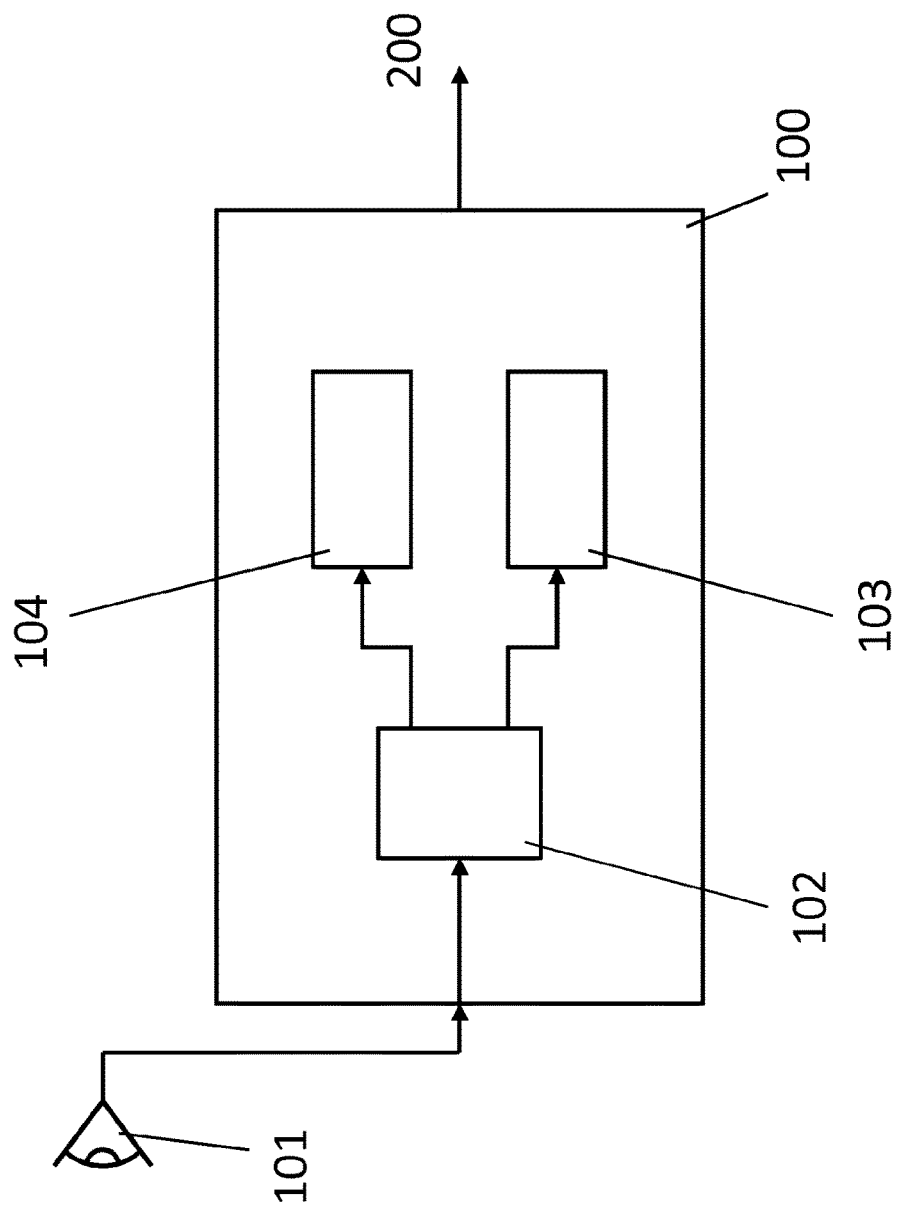
FIG. 1b illustrates schematically initial processing stages of a pre-filter.

As illustrated in FIG. 1b, the analyzer 100 may include initial processing stages of a pre-filter implemented for example as a separator 102 for separating the collected data into an input-trace 103 and into an output-trace 104. The input-trace 103 includes a collection of data flowing into or received by the transaction-processing system 1. The output-trace 104 includes a collection of data flowing out from or transmitted by the transaction-processing system 1. The traces 103, 104 may be stored in a data store accessible by the analyzer 100, such as in a memory of the electronic device 10, in a hard disk attached to the electronic device 10, etc.

As illustrated in FIG. 1c, the analyzer 100 may include further processing stages for processing the input-trace 103 and the output-trace 104.

As illustrated in FIG. 1c, the analyzer 100 may include filters 105, 106 for suppressing in the traces 103, 104 unrelated data, such as data related to the operation of the network and/or data related to the transaction-processing system 1. For example, the filters 105, 106 may suppress TCP/IP related messages such as ARP messages (Address Resolution Protocol) or systems management (see https://en.wikipedia.org/wiki/Systems_management) related messages communicated between systems management tools (see https://en.wikipedia.org/wiki/List_of_systems_management_systems) and the transaction-processing system. Such filtering depends on the communication and/or tracing mechanisms and on system implementations.

During operation of the transaction-processing system 1, in particular during operation of the processing engine of the transaction-processing system 1, the transaction-processing system 1 receives from another system 21, 22, 41, 51, 31 a transaction order in the form of a receive order data record. For processing the transaction order, further information from other systems 21, 22, 41, 51, 31 or form Golden Sources data stores 61, 71 may be needed. Accordingly, the transaction-processing system 1 sends out respective send request data records and receives corresponding receive reply data records from the other systems 21, 22, 41, 51, 31 or form Golden Sources data stores 61, 71. At the end of the processing of the transaction, the transaction-processing system 1 may transmit a transaction result in the form of zero or more send result data records sent to zero or more other systems 21, 22, 41, 51, 31 or to Golden Sources data stores 61, 71. Thus, the input-trace 103 includes a plurality of input data records comprising a plurality of receive order data records and a plurality of receive reply data records, while the output-trace 104 includes a plurality of output data records comprising a plurality of send request data records and (typically) a plurality of send result data records. A transaction comprises a receive order data record defining the transaction, optional send request data records related to the transaction, a number of receive reply data records corresponding to the send request data records, and zero or more send result data records.

The collection of data in the traces 103, 104 includes an interface identifier in the form of an attribute identifying the interface with the respective other system 21, 22, 41, 51, 31 or Golden Sources data stores 61, 71. For example, the interface identifier may include an IP address/port number pair, wherein the IP address identifies a system 21, 22, 41, 51, 31 and the port number identifies a connection into a process running on that system 21, 22, 41, 51, 31.

The distinction between receive order data records and receive reply data records may be provided by a human operator, for example by providing corresponding configuration data to the analyzer 100. Typically, this may be done by interface (with all transaction orders arriving through one or a small number of interfaces) or by message format (e.g. certain types of SWIFT messages are transaction orders, recognizable from the first few fields of the data record).

The determination of whether an input data record represents a receive order data record or a receive reply data record may be enabled by the (input) interface-separator 107 or by the (input) field-separator stage 111, which are both described below.

As illustrated in FIG. 1c, the analyzer 100 may include interface-separators 107, 108 respectively connected to the filters 105, 106 for separating the traces 103, 104 into separate channels in accordance to the respective interface identifier.

As illustrated in FIG. 1c, the analyzer 100 may include record-separator stages 109, 110 respectively following the interface-separators 107, 108 for identifying individual data records. Identification of individual data records may be based on communication messages containing exactly one record, and/or based on fixed size data records, and/or based on data records which include a length field, and/or based on a record terminating item such as a newline character in CSV format (Comma Separated Values), and/or based on a grammar such as a closing brace '}' matching the initial opening brace '{' in the JSON format or a finishing end tag '</Tag>' matching the initial start tag '<Tag>' in the XML format. Identification of individual data records may be determined otherwise. Each data record may include a Unique Record Identifier. The record-separator stages 109, 110 may be designed to add a Unique Record Identifier to each data record. The Unique Record Identifier may be based on a counter counting up for every data record, a fingerprint (https://en.wikipedia.org/wiki/Fingerprint_(computing)) or on a collision-resistant hash function (https://en.wikipedia.org/wiki/Hash_function) over the send request data record. The Unique Record Identifier may depend on the Interface of the data record.

As illustrated in FIG. 1c, the analyzer 100 may include field-separator stages 111, 112 respectively following the record-separator stages 109, 110 for identifying individual data fields. Identification of individual data fields may be enabled in a similar manner as the identification of data records.

As illustrated in FIG. 1c, the analyzer 100 may include request/reply record associators 120 and a transaction order record associator 130 following the field-separator stages 111, 112.

In accordance to the previous stages, which may be implemented in alternative ways, and as illustrated in FIG. 1c, the input to the request/reply record associator 120 includes data records with predefined data fields. As illustrated in FIG. 1c, the transaction request record associator 130 receives output data from the request/reply record associator 120 and data records having predefined data fields. Each data record is provided such that it can be at least determined if it is an input data record received by the transaction processing system 1 or an output data record transmitted by the transaction processing system 1. Moreover, each data record is provided such that at least the interface identifier of the data record can be determined.

As illustrated in FIG. 2, the analyzer 100 establishes a functional data flow representation 200 of the traces 103, 104 having the following properties: all data records 201, 202, 203, . . . are separated; all data records 201, 202, 203, . . . contain a data field containing a unique ID; all data records 201, 202, 203, . . . contain a data field Op defining SEND or RECEIVE; all data records 201, 202, 203, . . . contain a data field Attr defining further attributes enabling identification if the data record concerns a receive order data record, a send request data record, a receive reply data record, a send result data record, etc.; all data records 201, 202, 203, . . . contain a data field Ra defining the request/reply association (unique ID of associated data record, used for send request data records and receive reply data records, unused for the others), all data records 201, 202, 203, . . . contain a data field Ta defining the transaction association (unique ID of associated receive order data record); all data fields of a data record 201, 202, 203, . . . are separated; data records 201, 202, 203, . . . are formatted as "functions" with values being defined represented as results of a function, i.e. [v0, v1, . . . , vn]=f ( . . . ) and values being used represented as parameters of a function, i.e. [ . . . ]=g(w0, w1, . . . , wm). Initially, an input data record is transformed into the form [v0, v1, . . . , vn]=RECEIVE(Interface), and an output data record is transformed into the form [ ]=SEND(Interface, w0, w1, . . . , wm). Note that the combination of data fields Op and Attr further distinguishes receive order data records (with Op=RECEIVE and Attr={ORDER}), send request data records (with Op=SEND and Attr={REQUEST}), receive reply data records (with Op=RECEIVE and Attr={REPLY}), and send result data records (with Op=SEND and Attr={RESULT}). Note that further data record attributes may be set during processing, and that parameters and results might be added, deleted, or updated during the analysis; external requests and replies are associated; every data record 201, 202, 203, . . . is associated to a send order data record (i.e. a RECEIVE {ORDER}function), which represents the transaction, with the send order data record being associated to itself.

The described data fields associated with a data record are one possible implementation of the concept, with other implementations being possible, e.g. combining data fields Op and Attr into a single data field. A person skilled in the art will recognize such alternative implementations.

In the following, the request/reply record associator 120 is described in more detail. The request/reply record associator 120 seeks to associate send request data records (SEND {REQUEST}) with receive reply data records (RECEIVE {REPLY}).

As illustrated in FIG. 1a, the transaction-processing system 1 relies on the other systems 21, 22, 41, 51, 31 or on the Golden Sources data stores 61, 71 to obtain additional data records related to a transaction (e.g. customer account information for processing a payments transaction), or to obtain additional data records required for transaction processing (e.g. payment path information indicating through which foreign banks a foreign payment would be routed), or to delegate part of the needed operations for transaction processing to another system (e.g. calculating fees). To interact with the other systems 21, 22, 41, 51, 31 or with the Golden Sources data stores 61, 71, the transaction processing system 1 uses a request/reply model: a send request data record is sent to another system 21, 22, 41, 51, 31 or to a Golden Sources data store 61, 71, and a receive reply data record is received from the respective other system 21, 22, 41, 51, 31 or from the respective Golden Sources data store 61, 71 at a later point in time.

The send request data record contains data about the type of request, parameter data, and often a Unique Request Identifier. The subsequent receive reply data record contains the result data, which may include the requested data, the results of a delegated operation, an acknowledgement of the execution of a delegated operation, or data indicating an error and data providing further details on the error, and often the Unique Request Identifier provided in the corresponding send request data record.

The ability of the transaction-processing system 1, in particular the processing engine of the transaction-processing system 1, to operate on multiple transactions in parallel or in an overlapping fashion, and the related ability to operate on multiple send request data records in parallel or in an overlapping fashion for most other systems 21, 22, 41, 51, 31 and the Golden Sources data stores 61, 71 requires a mechanism to identify the corresponding send request data record for a receive reply data record to ensure correct operations of the transaction-processing system 1.

Possible mechanisms include: a Unique Request Identifier generated by the transaction-processing system 1 and passed to the other system 21, 22, 41, 51, 31 or to the Golden Sources data store 61, 71 together with the send request data record, which is repeated in the corresponding receive reply data record, wherein the Unique Request Identifier is usually at a fixed data field position in both the send request data record and the receive reply data record and thus allows association of a particular send request data record with the corresponding receive reply data record; key data fields of the send request data record identifying the actual send request data record being repeated in the receive reply data record; non-parallel and non-overlapping execution of send request data records by the other system 21, 22, 41, 51, 31 or by the Golden Sources data store 61, 71, i.e. a receive reply data record always corresponds to the last submitted send request data record, which is often called a 'fully synchronous interface' between the transaction-processing system 1 and the other system 21, 22, 41, 51, 31 or the Golden Sources data store 61, 71.

The request/reply record associator 120 is configured to associate send request data records having one interface identifier to receive reply data records having another interface identifier for any of the described mechanisms, or a combination thereof, as follows.

In the case of a Unique Request Identifier being used, the request/reply record associator 120 uses four configuration parameters Request_Interface and Reply_Interface providing the interface identifier on which send request data records and receive reply data records are communicated, as well as UID_Request_FieldPos and UID_Reply_FieldPos indicating at which Field position the Unique Request Identifier is stored. These parameters may be provided by a human operator. The request/reply record associator 120 includes an associative memory which maps Unique Request Identifiers to a pair of Unique Record Identifiers for the send request data record and the receive reply data record, respectively. During processing of the data records, the request/reply record associator 120 effects: on recognition of a send request data record having interface identifier Request_Interface, it extracts the data field at position UID_Request_FieldPos (i.e. the Unique Request Identifier), and the Unique Record Identifier for the send request data record. It then stores a new mapping "(Unique Request Identifier)->(Unique Record Identifier, undefined)" in the associative memory circuitry, with the 'undefined' value indicating that the corresponding receive reply data record is not yet known. Should the associative memory circuitry detect that there is already an entry for the same Unique Request Identifier, it provides an error message enabling further processing or manual inspection by a human operator, as the Unique Request Identifier is indeed not unique within the trace; on recognition of a receive reply data record on Interface Reply_Interface, it extracts the data field at position UID_Reply_FieldPos (i.e. the Unique Request Identifier), and the Unique Record Identifier for the receive reply data record. It requests the associative memory to retrieve the entry for Unique Request Identifier, and to update the entry with the Unique Record Identifier of the currently processed record (i.e. the receive reply data record). The associative memory circuitry returns the pair "(Unique Record Identifier [for the send request data record], Unique Record Identifier [for the receive reply data record])", which is then being used by the request/reply record associator 120 to amend the send request data record with the Unique Record Identifier of the associated receive reply data record, and vice versa. Should there be no entry for the Unique Request Identifier in the associative memory circuitry, indicating no corresponding send request data record has been processed, an error may be flagged enabling further processing or manual inspection by a human operator. Furthermore, should the second association field (the Unique Record Identifier for the receive reply data record) not be stored as 'undefined', there are multiple receive reply data records for the same Unique Request Identifier, which may also be flagged enabling further processing or manual inspection by a human operator.

The above assumes that the send request data record is always processed before the receive reply data record, which is the case if the input- and output-traces 103, 104 contain data in the order of occurrence (note that during the operations of the transaction-processing system 1, the send request data record always precedes the corresponding receive reply data record). Should that not be the case due to the way the input and output traces are collected, above mechanisms can be adapted to correctly recognize the associations also if the receive reply data record is processed first.

In the case of key data fields of the send request data record being repeated in the corresponding receive reply data record, the mechanism is similar to the above, with the following differences: There are no configuration parameters UID_Request_FieldPos and UID_Reply_FieldPos. Instead of storing the Unique Request Identifier as key in the associative memory, the whole send request data record is stored, along with the pair of Unique Record Identifiers identifying send request data record and receive reply data record. The associative memory implements retrieval not using a single match of a Unique Request Identifier, but by comparing every field in a stored send request data record with every field in the current receive reply data record, counting the number of matches, and returning the entry with the largest number of matches, or an error if there are multiple entries with the same number of matches (i.e. matching is ambiguous), and an error may be flagged enabling further processing or manual inspection by a human operator.

In the case of synchronous interfaces, the request/reply record associator 120 on recognition of a receive request data record in the Request_Interface stores the current Unique Record Identifier. This stored value is used on recognition of a receive reply data record in the Reply_Interface to amend the identified send request data record with the Unique Record Identifier of the corresponding receive reply data record, and vice versa. Should there be an error in the strict alternation between Request Records and Reply Records, an error may be flagged enabling further processing or manual inspection by a human operator The request/reply record associator 120 uses a configuration parameter to select which of the above described logic or strategy to use. In an embodiment, this configuration parameter is provided by a human operator. In an embodiment, this configuration parameter is generated automatically.

The above descriptions serve as examples for how send request data records and receive reply data records may be associated in the transaction-processing system 1, and how the present disclosure establishes an association between send request data records and receive reply data records obtained from input and output traces. There are other options how send request data records and receive reply data records are associated in the transaction-processing system 1, e.g. by using a Unique Request Identifier not stored in a fixed parameter position, but by tagging it with a specific tag. For example, if XML format were used for Request Records and Reply Records, the Unique Request Identifier could be marked with a start tag "<RequestID>" followed by the Unique Request Identifier followed by the end tag "</RequestID>", both in the Request Record and the Reply Record. A person skilled in the art will understand how to adapt above request/reply record associator 120 to also handle such cases, should they arise in the practical use of request/reply record associator 120. Such cases are also covered under this disclosure.

The transaction order record associator 130 associates every send request data record, receive reply data record (and send result data record, if applicable) with exactly one receive order data record. This allows to extract all data records belonging to a single transaction order from the traces 103, 104, effectively rescinding or rearranging the interleaving of data records from different transactions resulting from parallel or overlapping execution of the transactions.

Figure 1D:
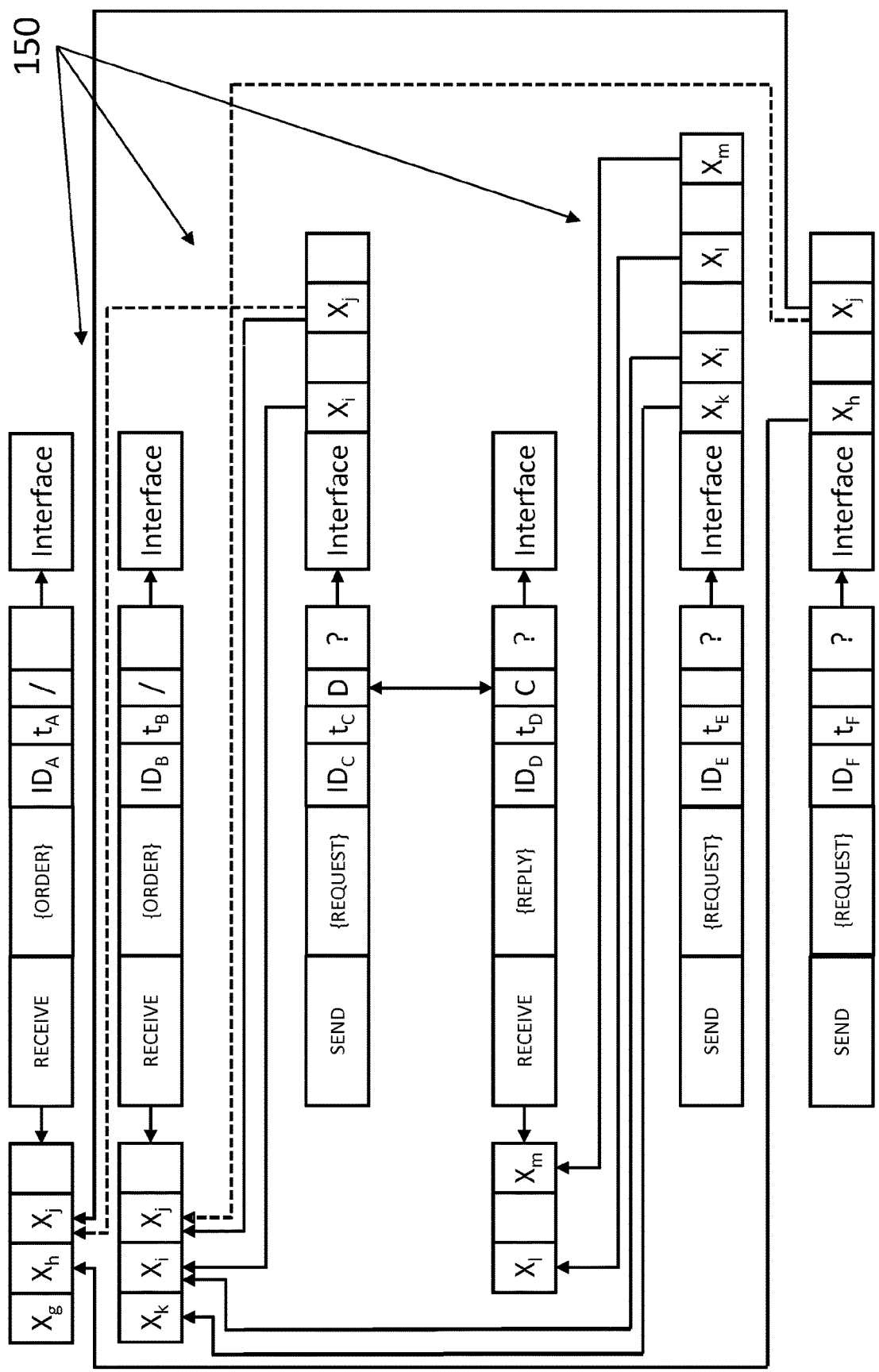
FIG. 1d illustrates determining indicative associations between individual fields of data records.

FIG. 1d illustrates schematically the mechanism, which is based on the following observations.

When creating send request data records or send results data records, transaction-processing systems often copy data obtained from the receive order data record or receive reply data records.

Given a certain field value X, such as $X_g$, $X_h$, $X_i$, $X_j$, $X_k$, $X_l$, $X_m$ indicated in FIG. 1d, looking for previous records where X appears as a result field (i.e. v.. on the left side of the functional data flow representation 200) yields an indicative association 150 from which other records the field might have been copied. Note that for some commonly occurring field values (such as "CHF" as a currency code in financial transaction-processing systems) there will be a very high number of such indicative associations 150, while for others (such as names like "Hugentobler" or account numbers "15 5.061.807.33") there will be a small number of such indicative associations 150.

If for a record, the indicative associations 150 to other records for all parameter fields have been collected, the mechanism may consider the transaction order record having most indicative associations 150 as the one to associate with.

The transitive relation is to be considered here: the purpose is not to associate a record with ANY other record, but with a receive order data record. As an example, for some record E (see the record labeled $ID_E$ in FIG. 1d), some fields may have an indicative association 150 to a receive order data record B, namely the fields $X_k$, $X_l$, and other fields to 22ordinary receive reply record D, namely the fields $X_l$, $X_m$, which by itself is associated with send request record C, which has many fields with an indicative association 150 to B, namely the fields $X_i$, $X_j$. Also for the field values having an indicative association 150 to D, namely the fields $X_1$, $X_m$, there is an implicit and transitive indicative association from E to B through receive reply data record D and its associated send request data record C. Note that for the purpose of the transaction order associator 130, the previously associated send request data records and receive reply records are always treated jointly.

As shown in FIG. 1d, send request data record C has two indicative associations from its parameter $X_j$, namely to receive order data records A and B, both having $X_j$ as a result, with one being drawn with a dashed connection. The same holds for send request data record F. As further described below, transaction order associator 130 includes mechanisms to decide which associations to retain between C and A or B, and between F and A or B, respectively.

Some indicative associations 150 are stronger or more important than others, namely: an indicative association 150 based on a rarely occurring field value (such as the name "Hugentobler") is stronger or more important than one based on an often occurring field value (such as "CHF"); an indicative association 150 between two records close in time is stronger or more important than one being very long apart.

Figure 1F:
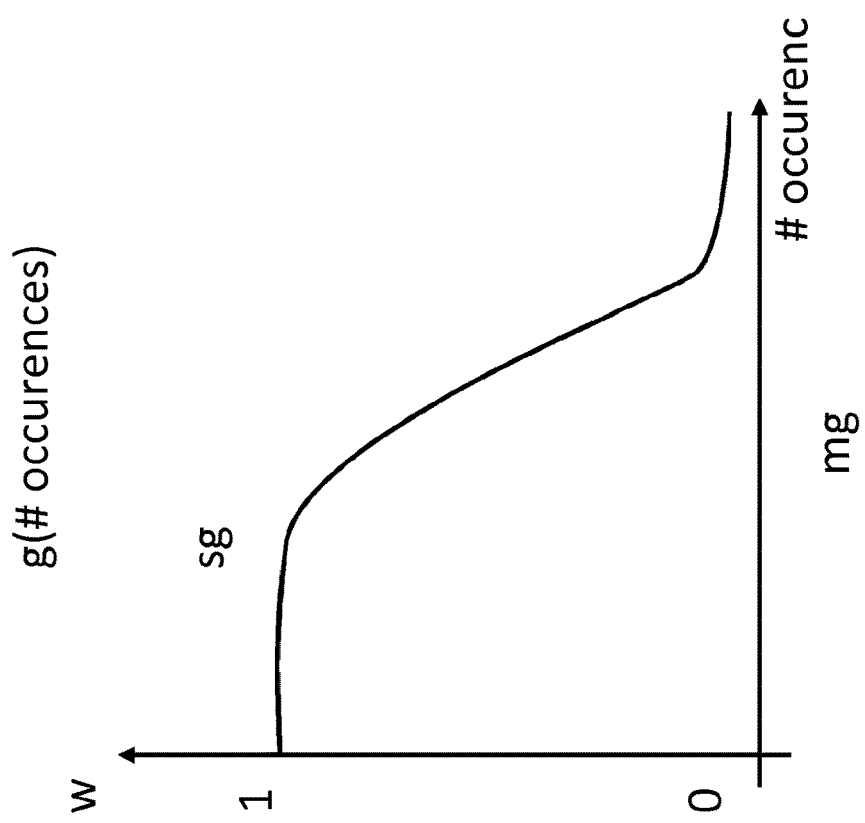
FIG. 1c illustrates schematically further processing stages of the pre-filter and the analyzer.
FIG. 1e,f illustrate possible non-linear functions for assigning association weight sums to the indicative associations.
FIG. 1g illustrates schematically an exemplary set of data records.
FIG. 1h illustrates schematically determining the number of occurrences of a data field.
FIG. 1i illustrates schematically determining indicative associations, assigning association weight sums, and determining associations between data records.
Figure 1E:
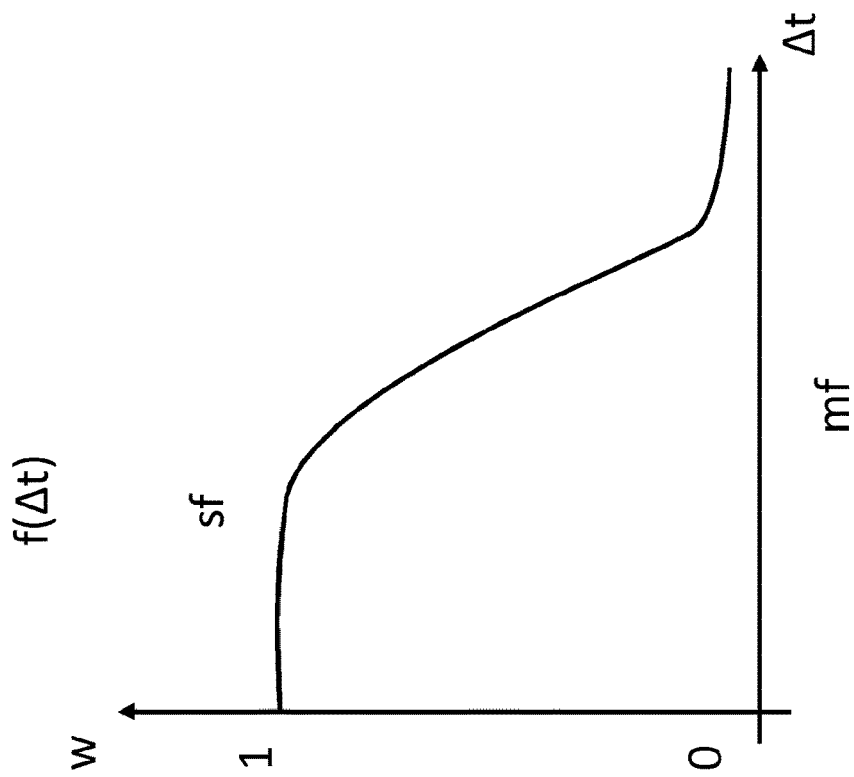

The mechanism thus assigns a weight to every indicative association 150 as w=f (delta t between the records)*g (number of occurrences of field). Functions f and g are "activation functions" as often used in machine learning (https://en.wikipedia.org/wiki/Activation_function). The mechanism uses a sigmoid function (cf. FIG. 1e, 1f), with configuration parameters for midpoint mf respectively mg and slope sf respectively sg of the functions, i.e. $f(d)=1-1/(1+sf*e^{(mf-d)})$ and $g(n)=1-1/(1+sg*e^{(mg-n)})$. Note that for indicative associations 150 having a very large delta t, the weight becomes very small, as it does for indicative associations 150 based on field values that occur very often. Other activation functions are possible. The configuration parameters may be set by a human operator. They may be obtained using machine learning by running the described association algorithm, and using gradient-descent approximation (https://en.wikipedia.org/wiki/Gradient_descent) to tune the parameters in a supervised learning mode, i.e. where the correct transaction association for a trace is known.

The mechanism calculates the weighted indicative associations for all parameter fields of all records. It does so using an associative memory storing all field values and mapping the field value to all "definitions" of the value (i.e. where the value is a result in the functional data flow representation, appearing on the left side; in FIG. 1d, $X_j$ being "defined" as the third result of receive order data record A and as third result of receive order data record B) and to all "uses" of the value (i.e. where the value is a parameter in the functional data flow representation, appearing on the right side; in FIG. 1d, $X_j$ being "used" as third parameter of send request data record C and as third parameter of send request data record F). For an individual parameter field value, the indicative associations are all "definitions" of the value in records occurring before the current record.

It then sets the "transaction association" attribute of a receive order data record to itself for all receive order data records, and traverses all other records in breadth first fashion (https://en.wikipedia.org/wiki/Breadth-first_search), calculating the sum of weights for the indicative associations for every possible receive order data record it could associate with, and selecting the association with the maximum sum of weights for the "transaction association" attribute.

FIGS. 1g-l illustrate in respective tables a numerical example for associating receive order data records with further send request data records and receive reply data records of a transaction-processing system. The numerical example according to FIGS. 1g-l is self-explanatory.

Send request data records and receive reply data records associated to each other through Unique Request Identifiers (see above) are treated jointly and associated to the same receive order data record. Note that receive reply data records do not include parameters in our functional data flow representation, and thus would not associate with any other records without this.

By traversing in a breadth first fashion, the mechanism ensures that for all indicative associations 150, the "transaction association" attribute of all indicatively associated records is already determined and can be used. Indicative associations may always link to "earlier" records, enabling that there cannot be any cycles.

Note that this mechanism is "greedy" in using local optima (i.e. maximum weights) to select between possible associations for a single record, and then using those associations in the selections for subsequent records. A more "global" mechanism would be to formulate the selection as a Linear Programming problem, with the objective function (to be maximized) being the sum of weights of all associations, and aspects such as that every record can only be associated to one transaction formulated as additional conditions to the Linear Program (https://en.wikipedia.org/wiki/Linear_programming). This Linear Programming problem may then be solved using any known solver, such as one implementing the simplex method (https://en.wikipedia.org/wiki/Simplex_algorithm).

The described mechanism depends on the data records being available in order of occurrence, and on each data record having a timestamp indicating when it was collected in the traces. Should data records not be provided to the transaction order record associator in order of occurrence, but include consistent timestamps, the order of occurrence is established by sorting all data records based on their timestamp. Should there be no timestamps, or should the timestamps not be reliable because of large deviations in the clocks used when collecting the traces, but if data records appear in order of occurrence, data records can be numbered up in order of occurrence and the resulting numbering be used instead of the timestamps. If there are neither consistent timestamps nor all data records in order of occurrence, the mechanism cannot determine which "definitions" precede a "use" of some field X, and has to assume that there are indicative associations to all "definitions" from all "uses" of field X. This can lead to cycles in indicative associations between data records, which then would not allow a breadth-first traversal of all indicative associations. In such cases, either above-mentioned Linear Programming solution can be used, or the described greedy mechanism can be preceded by a mechanism to detect indicative association cycles and break them at their weakest link, as people skilled in the art recognize.

For large traces, the number of indicative associations between "definitions" and "uses" of some field X can become very large, on the order O(m*n), where m is the number of "definitions" and n is the number of "uses", placing large burdens on the machinery both in terms of memory capacity needs as well as processing capacity needs. As persons skilled in the art will recognize, to limit this burden, the described mechanisms can be adapted to not consider indicative associations which would have very low weight (e.g. where definition and use are very long apart in time, or where there is a very large number of definitions and uses of the field value, or a combination of both), or it can be adapted to associate data records to transaction order data records when only part of the traces in terms of time have been processed, allowing to free up resources used by data records already associated.

The analyzer 100 as described above establishes the functional data flow representation 200 of the input-trace 103 and output-trace 104 of the transaction-processing system 1. The functional data flow representation 200 identifies the receive order data records, the send request data records and the receive reply data records involved, as well as send result data records, if applicable. The functional data flow representation 200 is a data flow representation with all known advantages of a data flow representation (https://en.wikipedia.org/wiki/Dataflow_programming).

The algorithms, modules, functional stages, etc. presented herein, in particular of the analyzer 100 and parts thereof such as the request/reply record associator 120, the transaction request record associator 130, etc., are not inherently related to any particular computer or other apparatus. Various general-purpose systems can be used with programs in accordance with the teachings herein, or it can prove convenient to construct more specialized apparatuses, such as hardware logic circuits. The required structure will appear from the description. As will be apparent to one of ordinary skill in the relevant art, the modules, features, attributes, methodologies, and other aspects can be implemented as software, hardware, firmware or any combination thereof. The present teaching is in no way limited to implementation in any specific operating system or environment.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. An electronic device for analyzing a processing engine of a transaction-processing system, the transaction processing system being connected to a network and being configured to receive and to transmit via the network data records related to transactions executed by the processing engine of the transaction-processing system, the electronic device being configured to:

determine a trace of interleaved data records from input and output traces of transactions of the transaction-processing system, the data records of the trace of interleaved data records comprising one or more data fields, wherein the data records lack a common unique transaction identifier enabling direct association to their respective transactions;

transform the data records into a computer-processable functional data flow representation comprising receive order data records represented as receive functions providing result values [v0, v1, . . . , vn]=RECEIVE (Interface), and comprising send request data records represented as send functions consuming parameter values [ ]=SEND(Interface, w0, w1, . . . , wm);

implement an associative memory which is configured to map result and parameter values to:

definitions, being result values from receive functions, and uses, being parameter values in send functions;
determine, by computationally matching uses of values to their definitions in the associative memory, indicative associations between the data records of the trace of interleaved data records;
assign, by applying a non-linear function to time differences between definition and use of values, and/or frequency distributions of values across the data records, association weight sums to the indicative associations of the data records of the trace of interleaved data records;
determine, by selecting the association weight sums having the highest weight sum, data records of the trace of interleaved data records being associated to each other, thereby enabling identifying in the trace of interleaved data records the data records which relate to respective transactions for providing an analysis as to how the processing engine of the transaction-processing system processes transactions.

2. The electronic device according to claim 1, further configured to subdivide the data records into a set of receive order data records, a set of send request data records, a set of receive reply data records, and optionally a set of send result data records, and to direct the indicative associations from the receive reply data records to the corresponding send request data records or optionally the send result data records to the corresponding receive order data records.

3. The electronic device according to claim 2, further configured to determine send request data records and receive reply data records being associated to each other based on a data field indicating an interface identifier and a data field indicating a unique request identifier, or based on a data field indicating an interface identifier and the contents of one or more data fields from the send request data record being replicated in the receive reply data record, or based on a combination thereof.

4. The electronic device according to claim 2, further configured to determine indicative associations between uses of values in the computer-processable functional data flow representation arising from send request data records or send results data records and definitions of values arising from receive reply data records or receive order data records, and to determine indicative associations between records based on indicative associations between uses and definitions contained in them.

5. The electronic device according to claim 1, further configured to assign association weight sums to the indicative associations based on the number of occurrences of the contents of one or more data fields.

6. The electronic device according to claim 1, further configured to assign association weight sums to the indicative associations based on a data field enabling determining a time difference between respective data records.

7. The electronic device according to claim 1, further configured to assign a set of data records to a particular transaction.

8. The electronic device according to claim 1, further configured to analyze data records in the form of one or more of: a comma separated list, an extended markup language, and a fixed binary record format.

9. The electronic device according to claim 1, further configured to receive configuration data enabling subdividing the data records into a set of receive order data records, a set of send request data records, a set of receive reply data records, and optionally a set of send result data records.

10. A method of operating an electronic device for analyzing a processing engine of a transaction-processing system, the transaction processing system being connected to a network and being configured to receive and to transmit via the network data records related to transactions executed by the processing engine of the transaction-processing system, the electronic device being configured to execute the method, the method comprising:
determining a trace of interleaved data records from input and output traces of transactions of the transaction-processing system, the data records of the trace of interleaved data records comprising one or more data fields, wherein the data records lack a common unique transaction identifier enabling direct association to their respective transactions;
transforming the data records into a computer-processable functional data flow representation comprising receive order data records represented as receive functions providing result values [v0, v1, . . . , vn]=RECEIVE (Interface), and comprising send request data records represented as send functions consuming parameter values [ ]=SEND(Interface, w0, w1, . . . , wm);
implementing an associative memory which is configured to map result and parameter values to:
definitions, being result values from receive functions, and
uses, being parameter values in send functions;
determining, by computationally matching uses of values to their definitions in the associative memory, indicative associations between data records of the trace of interleaved data records;
assigning, by applying a non-linear function to time differences between definition and use of values, and/or frequency distributions of values across the data records, association weight sums to the indicative associations of the data records of the trace of interleaved data records;
determining, by selecting the respective association weight sums having the highest weight sum, data records of the trace of interleaved data records being associated to each other, thereby enabling identifying in the trace of interleaved data records the data records which relate to respective transactions for providing an analysis as to how the processing engine of the transaction-processing system processes transactions.

11. The method according to claim 10, further comprising:
subdividing the data records into a set of receive order data records, a set of send request data records, a set of receive reply data records, and a set of send result data records, and directing the indicative associations from the receive reply data records to the corresponding send request data records or send result data records to the corresponding receive order data records.

12. The method according to claim 11, further comprising:
determining send request data records and receive reply data records being associated to each other based on a data field indicating an interface identifier and a data field indicating a unique request identifier, or based on a data field indicating an interface identifier and the contents of one or more data fields from the send request data record being replicated in the receive reply data record, or based on a combination thereof.

13. The method according to claim 10, further comprising:
assigning association weight sums to the indicative associations based on the number of occurrences of the contents of one or more data fields, and/or based on a data field enabling determining a time difference between respective data records.

14. The method according to claim 10, further comprising:
assigning a set of data records to a particular transaction.

15. The electronic device according to claim 1, wherein the processing engine of the transaction-processing system is configured to receive one or more transaction orders from one or more other systems, and to perform in accordance with the transaction orders sequences of operations, wherein one or more operations include transmitting one or more requests to the one or more other systems, and receiving one or more replies from the one or more other systems.

16. The method according to claim 10, wherein the processing engine of the transaction-processing system is configured to receive one or more transaction orders from one or more other systems, and to perform in accordance with the transaction orders sequences of operations, wherein one or more operations include transmitting one or more requests to the one or more other systems, and receiving one or more replies from the one or more other systems.

17. The method according to claim 11, further comprising determining indicative associations between uses of values in the computer-processable functional data flow representation arising from send request data records or send results data records and definitions of values arising from receive reply data records or receive order data records, and determining indicative associations between records based on indicative associations between uses and definitions contained in them.

* * * * *